June 30, 1964  G. ORLOFF ETAL  3,139,302
MECHANICAL HANDLING APPARATUS
Filed Sept. 5, 1962  2 Sheets-Sheet 2
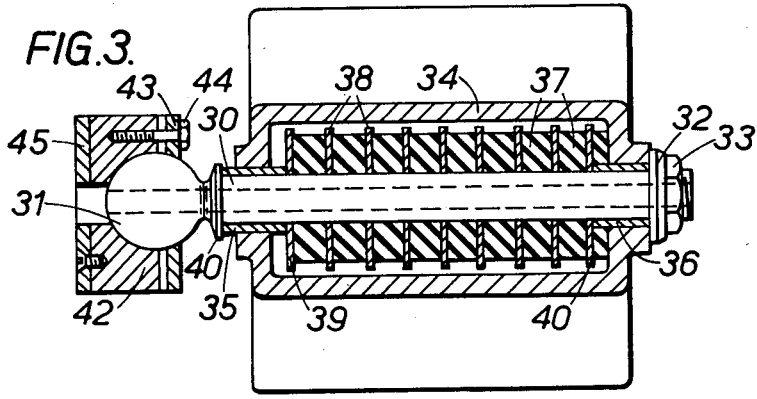
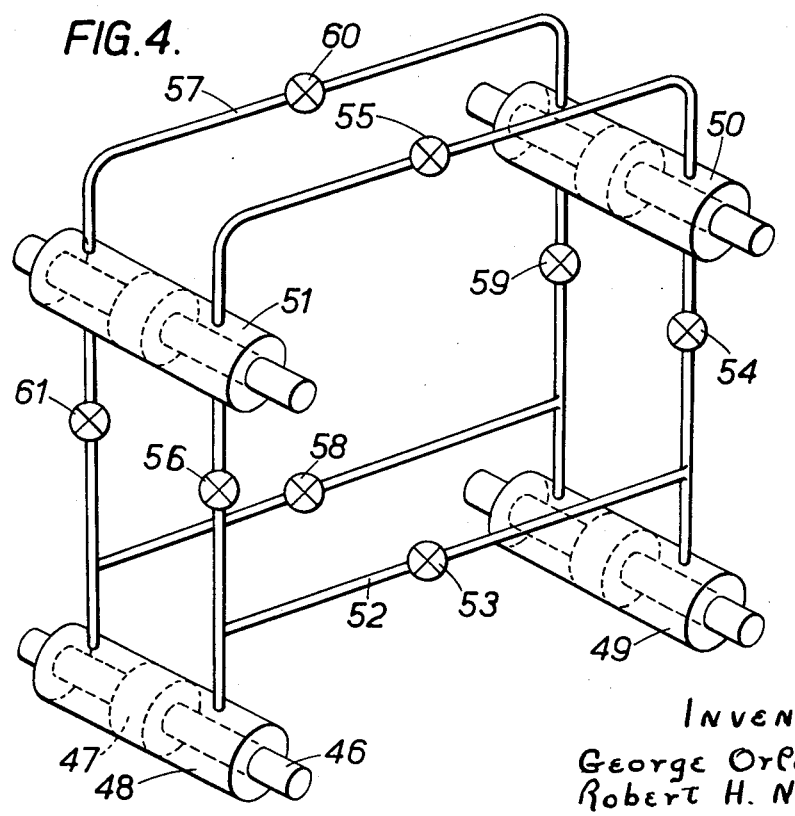
Inventors
George Orloff &
Robert H. Nisbet
By: Watson, Cole, Grindle & Watson
Attorneys

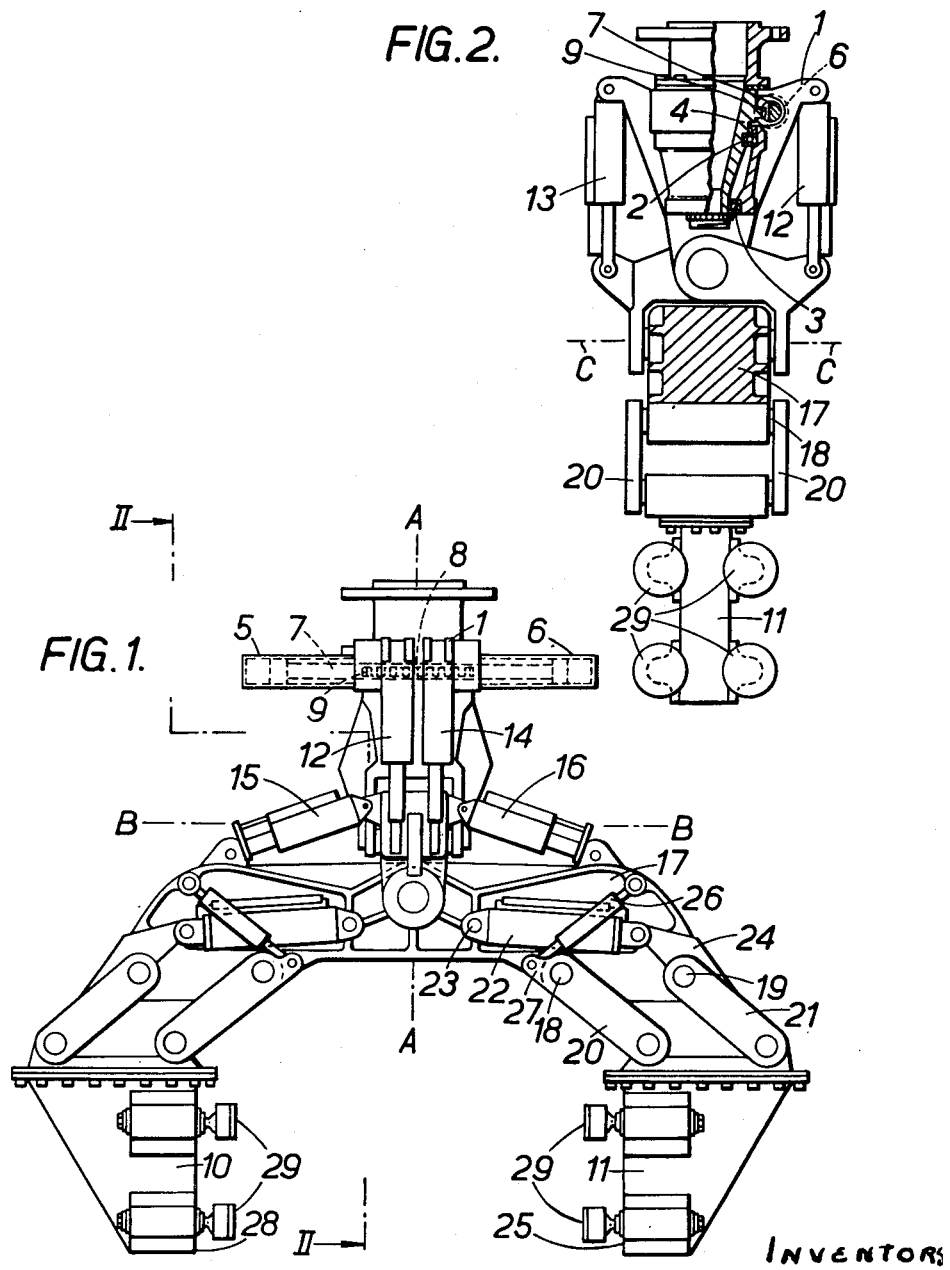

United States Patent Office 3,139,302
Patented June 30, 1964

3,139,302
MECHANICAL HANDLING APPARATUS
George Orloff, London, and Robert Hayes Nisbet, Brentford, Middlesex, England, assignors to Molins Machine Company Limited, London, England, a company of Great Britain
Filed Sept. 5, 1962, Ser. No. 221,596
Claims priority, application Great Britain Sept. 8, 1961
1 Claim. (Cl. 294—88)

This invention concerns improvements in or relating to mechanical handling apparatus in which a load object is gripped by gripping members and is moved from one position to another.

In mechanical handling equipment as disclosed in United States application Serial No. 196,810, filed May 22, 1962, gripping members having a plain gripping surface are perfectly adequate for gripping and lifting rectilinear load objects having one pair of parallel sides.

When the shape of the load object is irregular, nonrectilinear or without parallel sides, provision must be made for the establishment of a well defined contact area between the surface of the load object and the surfaces of the gripping members.

It is the main object of the present invention, therefore, to provide such well defined contact areas for all possible shapes of load object within the physical limitations of the size of the mechanical handling equipment.

The invention sets out to achieve these contact areas by providing the gripping members with a plurality of contact pads, each pad being given three degrees of freedom of movement, two of these being limited rotation about the axes transverse to the direction of movement of the gripping members toward each other, said axes being transverse to each other, and the third being a linear degree of freedom of movement in the said direction of movement.

This object, as well as other objects and advantages of the invention, will be made clear in the following description taken in conjunction with the accompanying drawings, in which FIGURE 1 is an end view of mechanical handling apparatus, FIGURE 2 is a view on the line II—II of FIGURE 1, FIGURE 3 is a section, to a different scale, of part of the apparatus shown in FIGURE 1, FIGURE 4 is a schematic view of an alternative arrangement to that shown in FIGURE 3.

In FIGURE 1 there is shown a pair of gripping members suitable for inclusion in mechanical handling apparatus as disclosed in United States application Serial No. 196,810. A rotatable wrist 1 is supported by preloaded bearings 2 and 3 (FIGURE 2) on a stub axle 4 and is rotated about an axis AA, which is vertical in FIGURES 1 and 2, by means of a pair of opposed hydraulic jacks 5 and 6, which possess a common piston rod 7 (FIGURE 2). Formed on the piston rod 7 is a rack 8 engaging a pinion 9 fixed to the stub axle 4. Thus as the piston rod 7 is moved by one or other of the jacks 5 and 6 the wrist 1 rotates about the stub axle 4.

Supported from the wrist 1 are a pair of gripping members 10 and 11 and these are given rotary movement about a horizontal axis BB, as seen when viewing FIGURE 1, by opposed jacks 12 and 13. External load damping and weight compensation is effected by oleo-pneumatic dampers acting in parallel with the jacks 12 and 13. Only one damper 14 is shown and can be seen in FIGURE 1. Rotation of the gripping members 10 and 11 about an axis CC which is horizontal when viewing FIGURE 2 is achieved by opposed jacks 15 and 16 acting on a rocker body 17.

Pivoted to the rocker body 17 at pivots 18 and 19 are parallel linkages 20 and 21, to the other ends of which is attached the gripping member 11. A jack 22 pivoted at 23 to the rocker body 17 actuates a link 24 attached to the parallel linkage 21 and thus causes the gripping member 11 to move in a path such that its face 25 remains substantially parallel. Acting in opposition to the jack 22 is a preloaded jack 26 whose function is to prevent any backlash of the gripping member 11. One end of the jack 26 is pivoted to the rocker body 17 and the other end to an extension 27 of the parallel linkage 20. The gripping member 10 is provided with a similar set of units to cause it to move in a path in which its face 28 remains substantially parallel to the face 25.

Attached to each of the gripping members 10 and 11 is a cluster of four contact elements 29, one of which is shown in FIGURE 3. A hollow shaft 30 has one end turned to a ball 31 and the other end threaded to take a washer 32 and a compression setting nut 33. The shaft 30 is located within a housing 34 by means of two bushes 35 and 36. Threaded on the shaft 30, and free to move axially along it, are alternating rubber discs 37 and metal discs 38. Outer metal discs 39 and 40 bear respectively against the bushes 35 and 36 in such a way that the bush 36 is held at its ends between the disc 40 and the washer 32, while the bush 35 is held between the disc 39 and a fixed collar 41 of the shaft 30. The cylindrical surfaces of the bushes 35 and 36 are similarly located between the shaft 30 and the housing 34. The ball 31 is housed in a pad 42, being secured to it by a locking ring 43 and screws 44. Fixed to the pad 42 is a friction face 45 made from a friction material such as titanium.

The operation of the apparatus will now be described. The gripping members 10 and 11 are endowed with three degrees of freedom of movement relative to the stub axle 4 by means of the hydraulic jacks. These are: (i) limited rotation about a vertical axis AA (as seen when viewing both FIGURES 1 and 2), such rotation resulting from the actuation of the jacks 5 and 6 which cause the rack 8 to rotate about the fixed pinion 9 of the stub axle 4. (ii) limited rotation about a horizontal axis BB (as seen when viewing FIGURE 1) due to the action of the opposed jacks 12 and 13. (iii) limited rotation about a horizontal axis CC (as seen when viewing FIGURE 2) caused by the action of the opposed jacks 15 and 16.

The gripping member 11 is supported from the rocker body 17 by parallel linkages 20 and 21 and is caused to move towards or away from the opposite gripping member 10 by the extension or retraction respectively of the jack 22. The other gripping member 10 is similarly operated and both members move in substantially parallel paths so that the two faces 28 and 25 remain virtually parallel to each other.

The faces 25 and 28 of the gripping members 11 and 10 would be adequate for lifting a load object of a rectilinear shape but as soon as a load object whose shape is irregular relative to the two faces 25 and 28 is required to be lifted the gripping force exerted on the load object will be unevenly applied. The contact elements 29 extending from each face 25 and 28 in a cluster of four enable their friction faces 45 (see FIGURE 3) to be accommodated to the shape of the load object.

The ball 31 and the pad 42 form a ball and socket joint and thus the pad 42 and its friction face 45 have two degrees of freedom of movement relative to the ball 31 and thus to the hollow shaft 30. Each degree of freedom of movement is a limited rotational movement about an axis at right angles to the longitudinal axis of the shaft 30. A third degree of freedom of movement along the longitudinal axis of the shaft 30 is also available to the contact element. Closing of the gripping members on the load object causes a reaction to act on the contact element and to have a component along the longitudinal axis of the shaft 30. This component acting through the collar 41 transmits the force through the bush 35 on to the metal disc 39. The pad 42 and the shaft 30 move to the right as seen when viewing FIGURE 3, with the washer 32 moving away from the end of the housing 34. The force transmitted to the metal disc 39 causes the rubber discs 37 to be compressed with the metal discs 38 distributing the transmitted force evenly over the area of the rubber discs.

As the gripping members 10 and 11 are moved inwards on an irregularly shaped load object, the contact elements 29 remain fully extended with the rubber discs 37 fully relaxed until one element enters into contact with the load object. The pad 42 of the element first coming into contact moves over the ball 31 until it is aligned in such a way that the reaction acts through its centre. Further inward movement of the gripping members then causes the pad 42 and the shaft 30 to move to the right (as seen when looking at FIGURE 3). This movement transmitted through the collar 41 and the bush 35 is followed by movement of the metal disc 39 which puts the adjacent rubber disc into compression. A proportion of the movement is transferred to the next metal disc and so on. Further movement of the gripping members inwards increases the movement of the pad 42 and the shaft 30, thus increasing the compression of the rubber discs with maximum compression in the left hand outer disc and minimum compression in the right hand outer disc. The compression between adjacent rubber discs 37 varies by a constant amount and decreases from left to right.

Still further inwards movement of the gripping members results in maximum compression of all the rubber discs. At this stage the contact element 29 has a maximum stiffness in its axial direction and can be considered as a solid extension of the gripping member from which it extends. The gripping force exerted by such a fully compressed contact element is also a maximum so that any further inwards movement of the associated gripping member will lead to deformation of the load object. Provision is consequently made to stop further inwards movement of the associated gripping member though the other gripping member being separately actuated can continue to move inwards as long as none of its contact elements 29 have reached the fully compressed state. Details of this provision to stop the appropriate jack are not shown in the drawings and may consist of a limit switch, strain gauge, or other similar means.

When the load object is fully gripped by a contact element 29, the weight of the load acting vertical downwards imposes a couple on the shaft 30 with a vertically downward reaction through the bush 35 and a vertically upwards reaction through the other bush 36. Thus stiffness in a direction at right angles to the shafts longitudinal axis is maintained by the rigidity of the two bushes 35 and 36.

The amount of movement of the shaft 30 is controllable by the compression setting nut 33. By tightening this nut, the shaft 33 can be moved to the right (as seen in FIGURE 3) thereby imposing a state of pre-compression on the rubber discs 37. This varies the total movement only of the contact element 29 and not the final gripping force which can be varied by the setting of the limit switch, strain gauge or other similar means hereinbefore described.

An alternative arrangement whereby the contact elements are displaced in a direction approximately parallel to the direction of movement of the gripping members 10 and 11 is shown schematically in FIGURE 4. A contact element consisting of a ball 31 and pad 42 as described hereinbefore is attached to a rod 46 to which is fixed a piston 47 movable within a cylinder 48. In FIGURE 4 a cluster of four such cylinders is shown 48, 49, 50 and 51. The cylinders are interconnected in such a way that the cylinder spaces to the right of the pistons are connected through piping 52 and four valves 53, 54, 55 and 56 while the spaces to the left are similarly connected through piping 57 and valves 58, 59, 60 and 61. Such a system is a closed system with the fluid contained within it remaining constant for any position of the pistons. The permissable movement of the pads located at the ends of the rods 46 is dependent on the length of the cylinder and of the piston rods. When a gripping member from which such a cluster extends is moved towards a load object of irregular shape, one pad initially comes into contact with the load object. The piston associated with this pad then starts to move to the left, as will be seen when viewing FIGURE 4, whereupon fluid will be transferred from the left of the cylinder to the other three cylinders the pistons of which then start to move to the right. The fluid on the other side of the pistons, i.e. to their right as seen in FIGURE 4, flows in the opposite direction, from the three cylinders the pads of which are not yet in contact with the load object to the cylinder whose associated pad is in contact. As further inwards movement of the gripping member continues, a second pad comes into contact when fluid to the left of its associated cylinder starts to flow into the spaces to the left of the two free cylinders which thereupon continue moving to the right, as seen when looking at FIGURE 4. This sequence repeats itself until all four pads engage the load object and grip it with an equal pressure (due to the four cylinders being interconnected). Such a system possesses the advantage that all the pads engage the load object with an equal force.

The two sets of valves, 53, 54, 55 and 56 and 58, 59, 60 and 61, are included so that any one or more pad, can be isolated and therefore removed from the system. Such a course of action might be necessary if it were to be found desirable to lift a load object with three or less contact elements.

In order to prevent the gripping member continuing to move inwards when all the contact elements are gripping the load object, a pressure operated element located in the piping line 57 is fitted, but is not shown in FIGURE 4. This element is set to operate when the fluid pressure within the line 57 exceeds a set figure and its operation stops the actuation of the jack, 23, in FIGURE 1, and thus prevents any further inward movement of the gripping member 11.

Other configurations are possible. One of these includes sets of contact elements extending towards each other from fixed members or from members having limited movement or movements towards each other in finite steps. In such cases a fluid actuator is included so as to be able to move each set of contact elements towards the others. If the cylinders actuating each contact element are then interconnected, the configuration combines actuation of the sets of contact elements towards each other to grip the load object with the self aligning properties of the arrangement shown in FIGURE 4. By incorporating a selector valve between the fluid actuator and the sets of contact elements the latter can be made to move away from each other so as to release the load object. The selector valve can be a servo valve with pressure feedback from the cylinders actuating the contact elements.

Still further configurations are possible. It is to be understood that, although not described or illustrated, these come within the scope of the invention.

What we claim as our invention and desire to secure by Letters Patent is:

In mechanical handling equipment for gripping a load object, two gripping members movable toward each other, a set of contact elements extending from each said member, each contact element comprising a gripping pad, part of which defines a socket and a guide shaft having a ball-shaped end which is housed in said socket so that said gripping pad has at least two degrees of freedom of movement relative to said guide shaft, and compressive means comprising a double acting hydraulic piston and cylinder associated with each guide shaft, two sets of piping, one set of piping forming a connection between the ends of the cylinders which are adjacent the pads and the other set of piping forming a connection between the ends of the cylinders which are remote from the pads, and a valve positioned in each set of piping and arranged so that each side of each cylinder is isolatable, whereby said load object can be gripped between said members with at least one of said pads extending from each member in aligned contact with said load object.

References Cited in the file of this patent

UNITED STATES PATENTS

| | | |
|---|---|---|
| 911,684 | Shields | Feb. 9, 1909 |
| 2,768,018 | Ehmann | Oct. 23, 1956 |
| 2,896,994 | Fischer | July 28, 1959 |
| 3,056,625 | Timmerman | Oct. 2, 1962 |
| 3,086,552 | Ragsdale | Apr. 23, 1963 |